US010459885B2

(12) United States Patent
Rivera et al.

(10) Patent No.: US 10,459,885 B2
(45) Date of Patent: Oct. 29, 2019

(54) PORTABLE MEMORY DEVICE DATA MODELING FOR EFFECTIVE PROCESSING FOR A GAS TURBINE ENGINE

(71) Applicant: United Technologies Corporation, Hartford, CT (US)

(72) Inventors: Jorge Rivera, Cabo Robo, PR (US); Roberto Jose Vazquez, Vega Alta, PR (US)

(73) Assignee: United Technologies Corporation, Farmington, CT (US)

( * ) Notice: Subject to any disclaimer, the term of this patent is extended or adjusted under 35 U.S.C. 154(b) by 407 days.

(21) Appl. No.: 14/683,938

(22) Filed: Apr. 10, 2015

(65) Prior Publication Data

US 2015/0293930 A1 Oct. 15, 2015

Related U.S. Application Data

(60) Provisional application No. 61/978,548, filed on Apr. 11, 2014.

(51) Int. Cl.
*G06F 16/13* (2019.01)
*F02C 9/00* (2006.01)
*G05B 15/02* (2006.01)
*G06F 16/22* (2019.01)

(52) U.S. Cl.
CPC .............. *G06F 16/137* (2019.01); *F02C 9/00* (2013.01); *G05B 15/02* (2013.01)

(58) Field of Classification Search
CPC ......... G06F 17/30097; G06F 17/30312; F02C 9/00; G05B 15/02; F05D 2230/72; F05D 2260/80; F05D 2260/82

USPC ........................................................ 707/737
See application file for complete search history.

(56) References Cited

U.S. PATENT DOCUMENTS

| 7,486,495 | B1* | 2/2009 | Diederichs ......... G05B 19/4185 340/870.07 |
| 8,618,952 | B2* | 12/2013 | Mochizuki ....... G08G 1/096783 340/435 |
| 2002/0169746 | A1* | 11/2002 | Cowman ........... G06F 17/30011 |
| 2003/0018608 | A1* | 1/2003 | Rice ........................ G06F 21/14 |
| 2004/0176887 | A1* | 9/2004 | Kent ...................... G07C 5/008 701/29.5 |
| 2008/0065705 | A1* | 3/2008 | Miller .................... G05B 21/02 |
| 2008/0177505 | A1* | 7/2008 | Volponi ............. G05B 23/0297 702/185 |
| 2009/0192728 | A1* | 7/2009 | Wright ............... G01N 33/2888 702/33 |

(Continued)

OTHER PUBLICATIONS

John Morris, "8.3 Hash Tables", Data Structures and Algorithms, Jan. 1, 1998, pp. 1-2, http://www.cs.aukland.ac.nz/~jmor159/PLDS210/hash_tables.hml.

(Continued)

*Primary Examiner* — Hosain T Alam
*Assistant Examiner* — Nicholas E Allen
(74) *Attorney, Agent, or Firm* — O'Shea Getz P.C.

(57) ABSTRACT

A method to process Portable Memory Device (PMD) files from an electronic engine control system includes mapping each of a multiple of Health Report Code (HRC) records from a Portable Memory Device (PMD) such that each Health Report Code (HRC) record is accessible through a specific HRC number related to each of the multiple of Health Report Code (HRC) records.

12 Claims, 6 Drawing Sheets

(56) References Cited

U.S. PATENT DOCUMENTS

| | | | | |
|---|---|---|---|---|
| 2009/0326726 A1* | 12/2009 | Ippolito | .................... | H02J 3/14 700/291 |
| 2010/0023238 A1* | 1/2010 | Adibhatla | .......... | G05B 23/0254 701/100 |
| 2010/0332475 A1* | 12/2010 | Birdwell | .......... | G06F 17/30333 707/737 |
| 2011/0040470 A1* | 2/2011 | Qiu | .................. | F01D 19/00 701/100 |
| 2012/0330495 A1* | 12/2012 | Geib | .................... | F01D 21/003 701/29.6 |
| 2012/0330499 A1* | 12/2012 | Scheid | .................. | G01N 29/14 701/33.4 |
| 2013/0028174 A1* | 1/2013 | Cabos | .................. | H04L 51/063 370/316 |
| 2013/0046714 A1* | 2/2013 | Harris | ...................... | G01H 1/00 706/12 |
| 2013/0054056 A1* | 2/2013 | King | .................. | G06Q 10/0635 701/14 |
| 2013/0075463 A1* | 3/2013 | Campbell | .......... | G05B 23/0216 235/375 |
| 2013/0173218 A1* | 7/2013 | Maeda | ............... | G05B 23/0221 702/182 |
| 2013/0176418 A1* | 7/2013 | Pandey | .................. | G01N 25/72 348/83 |
| 2013/0197725 A1* | 8/2013 | O'Dell | .................. | H04L 67/125 701/14 |
| 2013/0253898 A1* | 9/2013 | Meagher | ............. | G06F 17/5009 703/18 |
| 2013/0255220 A1* | 10/2013 | Mathews, Jr. | ............ | F02C 9/00 60/39.24 |
| 2013/0268154 A1* | 10/2013 | Kreitmair-Steck | ... | B64F 5/0045 701/29.1 |
| 2013/0282336 A1* | 10/2013 | Maeda | ............... | G05B 23/0229 702/184 |
| 2014/0019092 A1* | 1/2014 | Phelps | ............... | G05B 23/0245 702/185 |
| 2014/0020460 A1* | 1/2014 | Ertz | ........................ | F01D 21/12 73/114.55 |
| 2014/0091811 A1* | 4/2014 | Potyrailo | ........... | G06K 19/0717 324/602 |

OTHER PUBLICATIONS

"Hash Table", Apr. 23, 2012, www.wikipedia.org.
EP search report for EP15163219.7 dated Sep. 1, 2015.

* cited by examiner

PORTABLE MEMORY DEVICE DATA MODELING FOR EFFECTIVE PROCESSING FOR A GAS TURBINE ENGINE

This application claims priority to U.S. Patent Appln. No. 61/978,548 filed Apr. 11, 2014.

BACKGROUND

The present disclosure relates to a gas turbine engine and, more particularly, to a pressure spike filter algorithm therefor.

Gas turbine engines may include a Full Authority Digital Engine Control (FADEC) system that controls aspects of engine performance to allow the engine to perform at maximum efficiency for a given condition. The FADEC system also detects transient conditions such as an engine surge and triggers appropriate operational responses such as a surge recovery sequence to temporarily reduce engine thrust to facilitate clearance of the surge.

An Off Board Prognostics Health Monitor (OBPHM) processes Portable Memory Device (PMD) files to diagnose events that an engine or lift system undergo during a flight mission. The OBPHM also uses Health Report Code (HRC) data in the PMD file to determine the usage of the engine modules and generate reports of interests.

A PMD file is a collection of binary files that serve as a repository for HRC data. In one system, there can be a total of 16 binary files in what is considered a single PMD file, each having a maximum size of 12 MB, yielding a total size of 192 MB for a single PMD file. The HRC data stored within the PMD files is segmented into 1 KB packets that contain the HRC number, when the HRC event took place, among other HRC specific data elements, including transient data. There is no guarantee on the order that the data is written to the file due to the hardware implementation of the bus that generates the feed for these files, meaning that reading an entire HRC event sequentially is impossible.

An OBPHM is expected to be able to process 8 PMD files within a 3 hour time frame. Each file shall begin processing within 15 minutes of the previous file and should complete processing within a 30 minute window. In other words, an OBPHM is expected to process a maximum of 1536 MB worth of HRC data within 3 hours.

Previous implementations of an OBPHM evolved to handle slightly growing file sizes and were successful in meeting processing requirements at their respective time. As time passed however, larger and larger PMD files were made available for testing and the implementation for an OBPHM had to continue evolving to handle memory issues that were caused by the growing file sizes.

One concern with OBPHM operations is with the growth of file size. The typical OBPHM could handle a single file around the size of 24 MB to 36 MB depending on the amount of actual usage HRCs in the file. Beyond this point resulted in "Out of Memory" exceptions. These results fall extremely short of the requested amount of data to be processed and the processing time for a single file of the before mentioned sizes requires 2 to 3 hours to complete.

Evolution of the OBPHM application initially loaded all HRC data into memory through internal processes known as "Chunking, Reassembly, and Reconstruction". This three-step approach to organizing the HRC data to enable an HRC event to be read sequentially for reporting purposes breaks down the files into 1 KB packet files ("Chunking") The files are stored on disk in a folder structure that made it easy to identify which packets belonged to what HRC and HRC instance ("Reassembly"). The files were then read back into memory as objects representing an HRC, composed of HRC instances, which in turn stored packets worth of transient data ("Reconstruction"). The fact that such a large file was literally being transformed into objects in memory and that the Java Heap Memory by default has a size of only 64 MB is what lead to the memory issues. Simply put, the Java Heap Memory ran out of space to create objects representing the packets, instances, and HRCs.

Efficiently, this implementation is relatively fast and at the time was capable of processing smaller files of about 12 MB within an allotted 10 minute window. Subsequent changes to OBPHM lead to having the "Reconstruction" process only bring in the transient data for the usage and lifing some HRCs instead of all the HRCs. This promised to speed up the process somewhat and reduce the memory footprint of the application. However, this was not sufficient to cope with files as large as 24 MB. A potential solution to this issue involves offloading some of the memory usage to the database to cope with larger file sizes.

This approach effectively allowed an OBPHM to store usage HRC transient data in the database for later retrievable and reporting. On files as large as 36 MB the approach seemed to work but offloading the memory to the database came at a cost. The processing time was now in the hours instead of the minutes. "Out of Memory" exceptions still occurred although more sporadically under this approach.

SUMMARY

According to aspect of the present disclosure, a method for processing Portable Memory Device (PMD) files is provided that includes the step of mapping each of a multiple of Health Report Code (HRC) records from a Portable Memory Device (PMD) such that each HRC record is accessible through a specific HRC number related to each of the multiple of HRC records.

A further embodiment of any of the foregoing embodiments of the present disclosure includes the step of time sorting the multiple of HRC records.

In a further embodiment of any of the foregoing embodiments of the present disclosure, at least one of the multiple of HRC records occurs more than once while mapping to form an instance.

In a further embodiment of any of the foregoing embodiments of the present disclosure, each instance is grouped and time sorted.

In a further embodiment of any of the foregoing embodiments of the present disclosure, the time sorted instances include a binary buffer pointer.

In a further embodiment of any of the foregoing embodiments of the present disclosure, the mapping includes time sorting each HRC record per HRC instance.

A further embodiment of any of the foregoing embodiments of the present disclosure includes the step of processing the Portable Memory Device (PMD) files from an electronic engine control system.

A further embodiment of any of the foregoing embodiments of the present disclosure includes the step of processing the Portable Memory Device (PMD) files from a gas turbine engine.

In a further embodiment of any of the foregoing embodiments of the present disclosure includes the step of processing the Portable Memory Device (PMD) files on an Off Board Prognostics Health Monitor.

According to another aspect of the present disclosure, a method for processing Portable Memory Device (PMD) files is provided that includes the step of generating a relationship between each of a multiple of Health Report Code (HRC) records, HRC instances, and packets within a Hash Map.

In a further embodiment of any of the foregoing embodiments of the present disclosure, each HRC instance is grouped and time sorted.

In a further embodiment of any of the foregoing embodiments of the present disclosure, each record in the Hash Map represents HRC data accessible through its specific HRC number.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
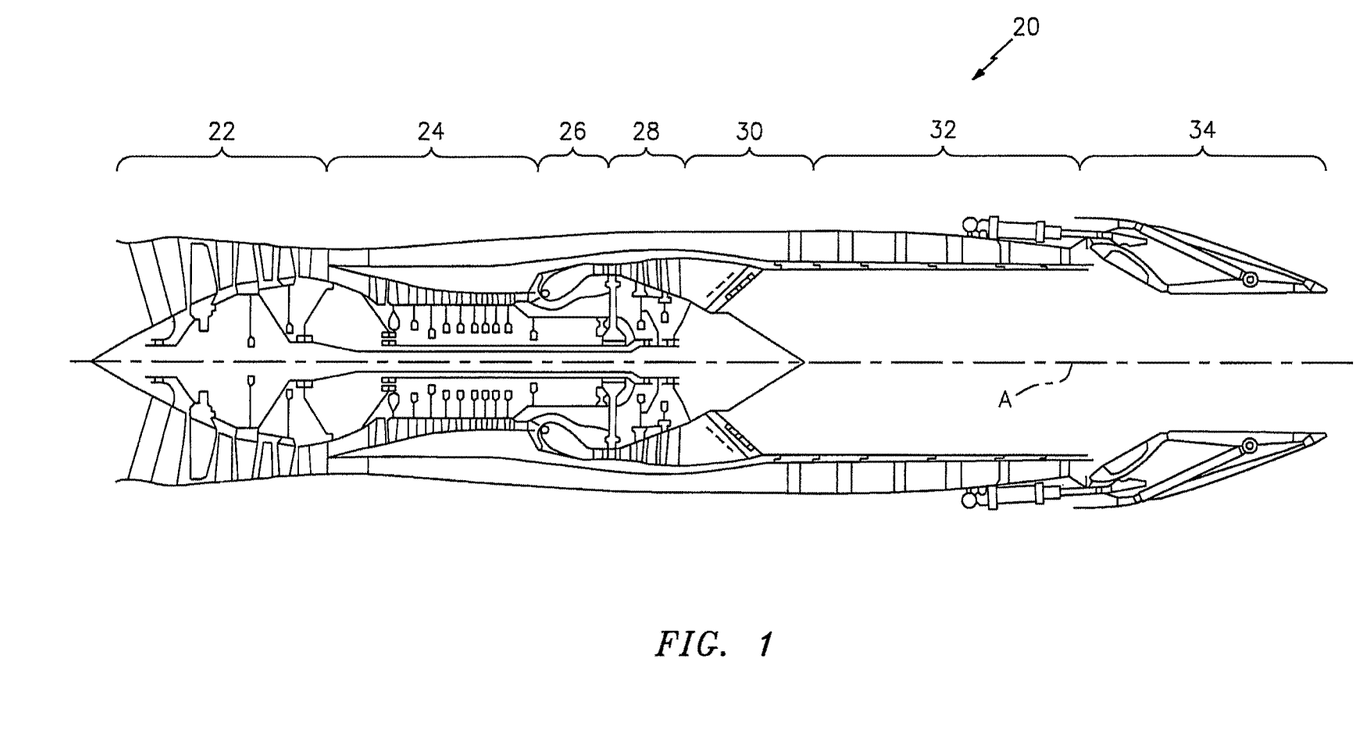
FIG. 1 is a general schematic view of an exemplary gas turbine engine.

FIG. 1 schematically illustrates a gas turbine engine 20. The gas turbine engine 20 is disclosed herein as a two-spool low-bypass augmented turbofan that generally incorporates a fan section 22, a compressor section 24, a combustor section 26, a turbine section 28, an augmenter section 30, an exhaust duct section 32, and a nozzle system 34 along a central longitudinal engine axis A. Although depicted as an augmented low bypass turbofan in the disclosed non-limiting embodiment, it should be understood that the concepts described herein are applicable to other gas turbine engines including non-augmented engines, geared architecture engines, direct drive turbofans, turbojet, turboshaft, multi-stream variable cycle and other engine architectures.

Figure 2:
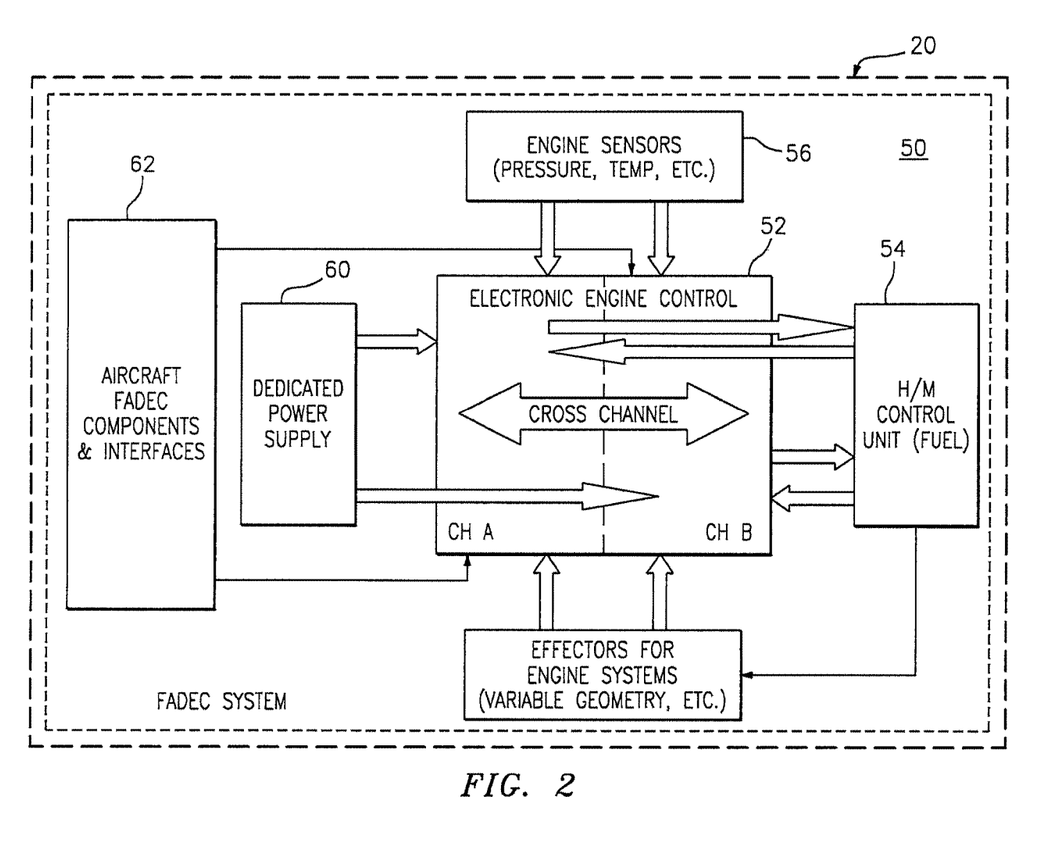
FIG. 2 is a schematic view of a Full Authority Digital Engine Control (FADEC) system.

With reference to FIG. 2, the gas turbine engine 20 includes a Full Authority Digital Engine Control (FADEC) system 50 that includes, among others, an electronic engine control (EEC) unit 52, a fuel metering unit (i.e., hydromechanical control unit) 54, engine sensors 56, effectors for engine systems (variable geometry vanes, etc.) 58, a dedicated power supply 60, FADEC interfaces 62 and others. The FADEC is a dual-channel system with two redundant channels, a first channel A and a second redundant channel B. Channels A and B provide redundancy in the engine control and operation.

The EEC unit 52 generally includes a processor 70, a memory 72, and an interface 74. The processor 70 may be any type of known microprocessor having desired performance characteristics. The memory 72 may be any computer readable medium which may store data and/or control algorithms. The interface 74 facilitates communication with other components, systems and subsystems. It should be appreciated that various other components, systems and subsystems may be utilized herewith.

Figure 3:
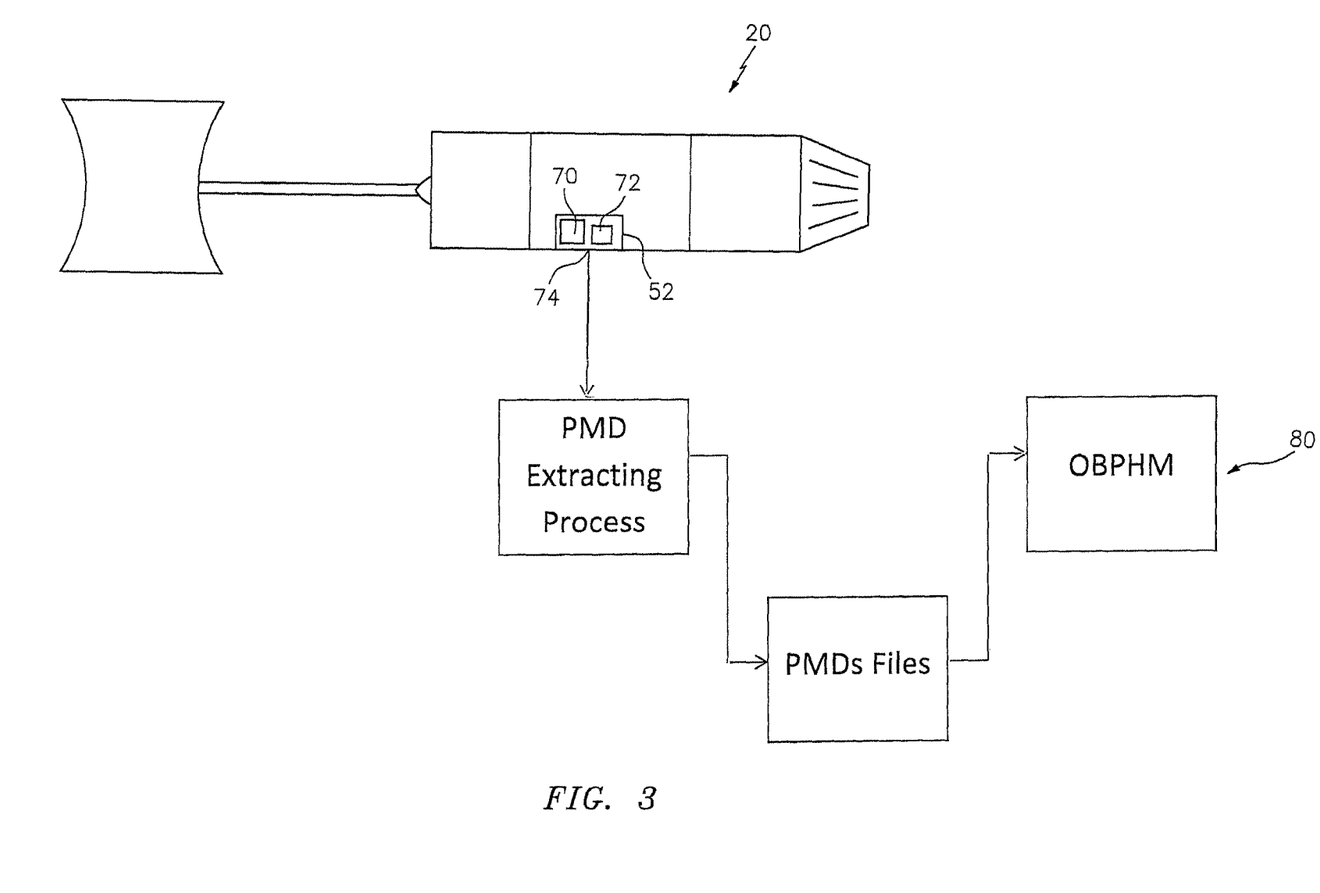
FIG. 3 is a schematic view of an Off Board Prognostics Health Monitor (OBPHM) that processes Portable Memory Device (PMD) files from the FADEC.

With reference to FIG. 3, the EEC unit 52 generally includes a processor 70, a memory 72, and an interface 74. The processor 70 may be any type of known microprocessor having desired performance characteristics. The memory 72 may be any computer readable medium which stores data and control algorithms. The interface 74 facilitates communication with other components, systems and subsystems. It should be appreciated that various other components, systems and subsystems may be utilized herewith.

The interface 74 may further be utilized to communicate with an OBPHM 80. FIG. 3 schematically illustrates the communications to the OBPHM via a PMD Extracting Process and PMD Files. It should be appreciated that various communication paths, wired and unwired will benefit herefrom to communicated data between the engine 20 and the OBPHM 80.

Figure 4:
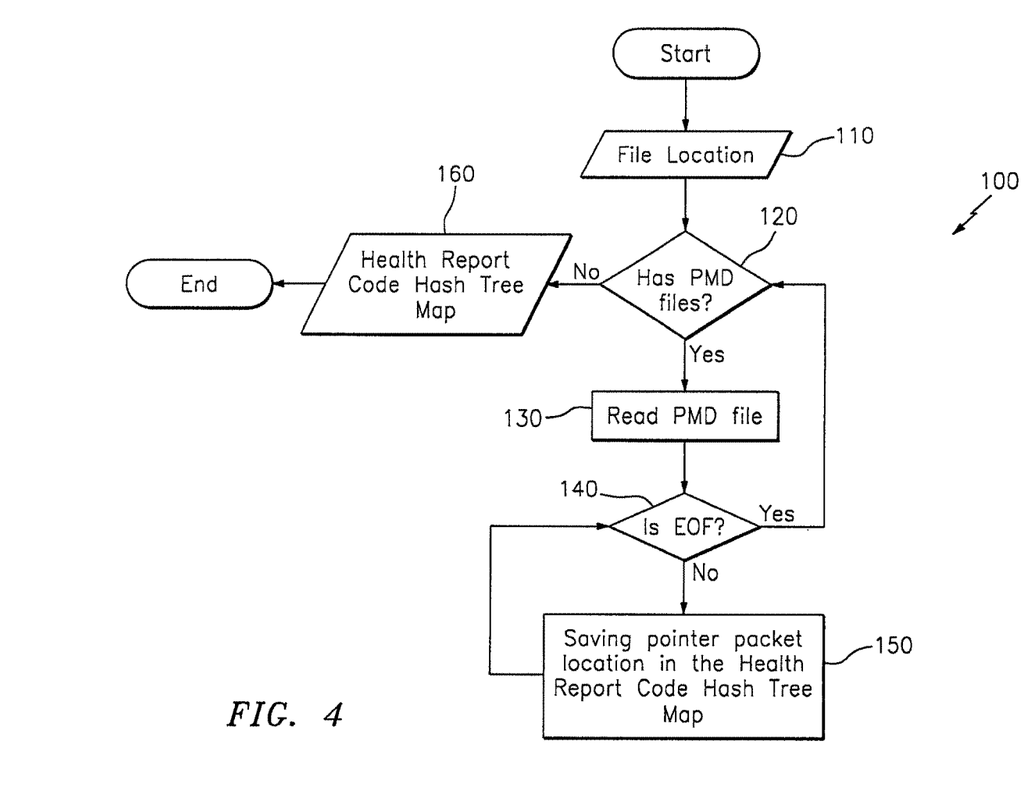
FIG. 4 is a process flow chart illustrating generation of a Health Report Code Hash Tree Map.

With reference to FIG. 4, a method 100 to process Portable Memory Device (PMD) files from the engine 20 within the OBPHM 80 includes reading the data needed directly from the PMD file to relatively quickly offload memory from the Java Heap. This is the same data that is being put into the database to be later read back by an application. Java's traditional IO libraries makes this task time consuming and also memory and processor intensive as traditional Java IO libraries are based on streams that are efficient for reading data sequentially but lack the performance needed to access random bits of information. Essentially, accessing the last element byte of a file followed by a byte of data somewhere in the middle of the file requires two entire sequential read operations of the file. A single sequential read operation of a 192 MB PMD file resulted in a sequential read time of almost 2 minutes making the traditional Java IO libraries an undesirable solution for the task.

This is where Java New Input Output (NIO) is involved. This library specifically addresses use cases where OBPHM would want to access random bytes of information. NIO operates through generation of a Byte Buffer (e.g., a byte backing array) to read in data from the file or write data to the file. An advantage to having a backing array is that the application can specify what positions of the array are to be read from or written to. NIO also provides the generation of Direct Byte Buffers that are buffers that reside outside the Java Heap. This opens the opportunity to utilize a computer's physical memory to store the Byte Buffer. The cost for this convenience is the probable loss of portability since Java depends on the underlying operating system to support the feature, meaning that the implementation may behave differently when run under a different operating system. Use of a computer's physical memory, however, provides the same effect as the database did by handling a large portion of the memory load.

Once the PMD file is loaded into physical memory and made accessible through a Byte Buffer, a "database" out of the PMD files is created with a mapping scheme that allows the OBPHM to read the information when needed. Generating such a structure requires that the entire file be read and organized much the same way as the old "Chunking, Reassembly, and Reconstruction" process did before. Java Hash Maps are a very useful data structure for making such a map. However, such maps tend to be memory intensive when loaded with bloated classes. As such, lightweight classes are created which avoid storing the actual values. When these lightweight classes are stored in a Hash Map (FIG. 5), the combination provides a structured and time ordered representation of the HRC data within the PMD files. In other words, the relationship between the HRC records, HRC instances, and packets are represented by the Hash Map and classes stored within.

Referring to FIG. 4, as each file is read (step 110), a determination is made as to whether the file location has PMD files (step 120) and if so, the PMD file is read (step 130) until the End of File (EOF; step 140) is reached. If EOF is not reached, the binary buffer pointer packet location is saved in the Health Report Code Hash Tree Map (step 150; see also FIG. 5). Once EOF is reached the Health Report Code Hash Tree Map is complete (step 160). Accessing any specific HRC record is readily achieved by providing service methods over the mapped structure of the PMD data. Using this mapping scheme is also more efficient from a coding perspective than having to read (stream) the data to downstream processes.

Figure 5:
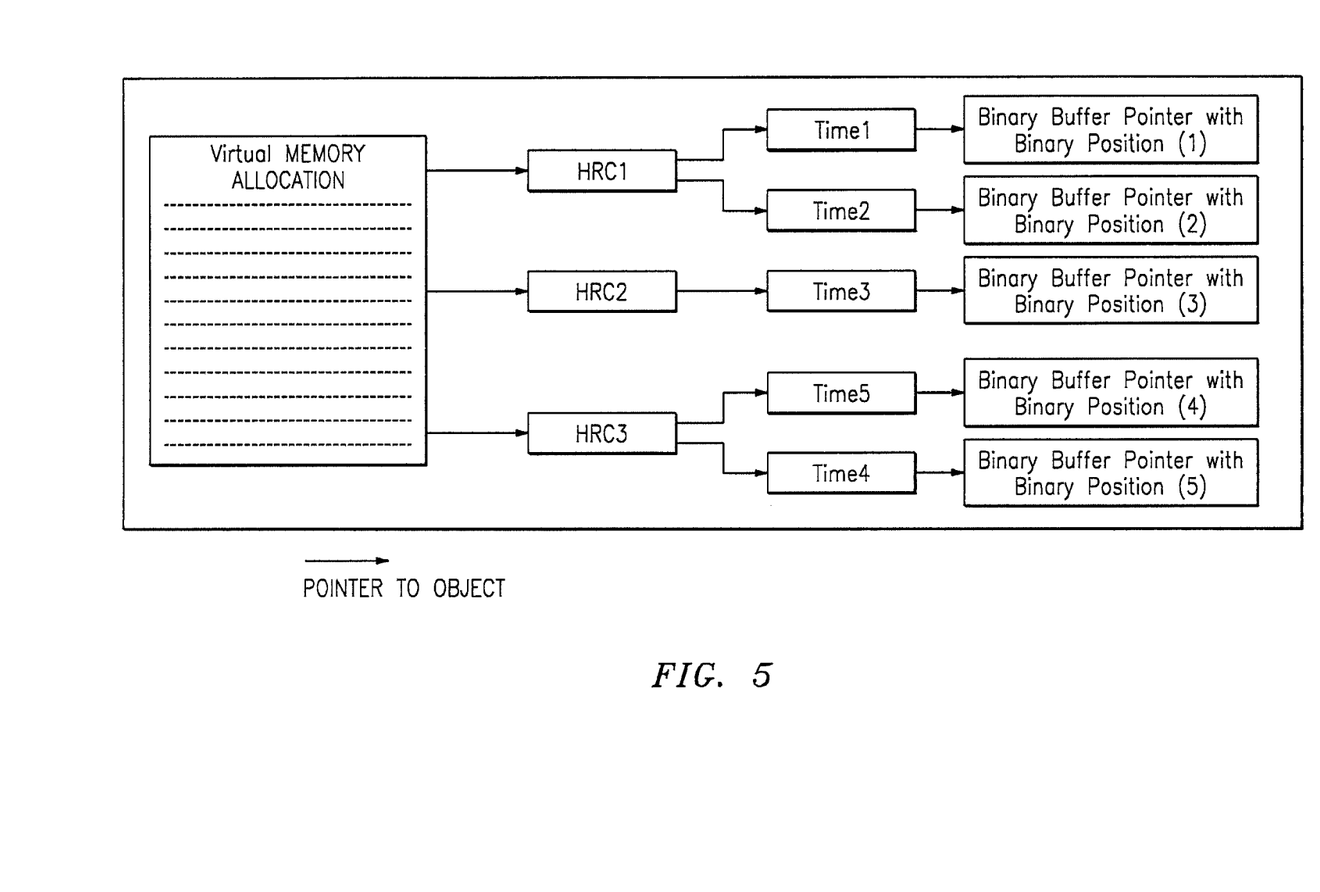
FIG. 5 is an example structure of a Health Report Code Hash Tree Map.
Figure 6:
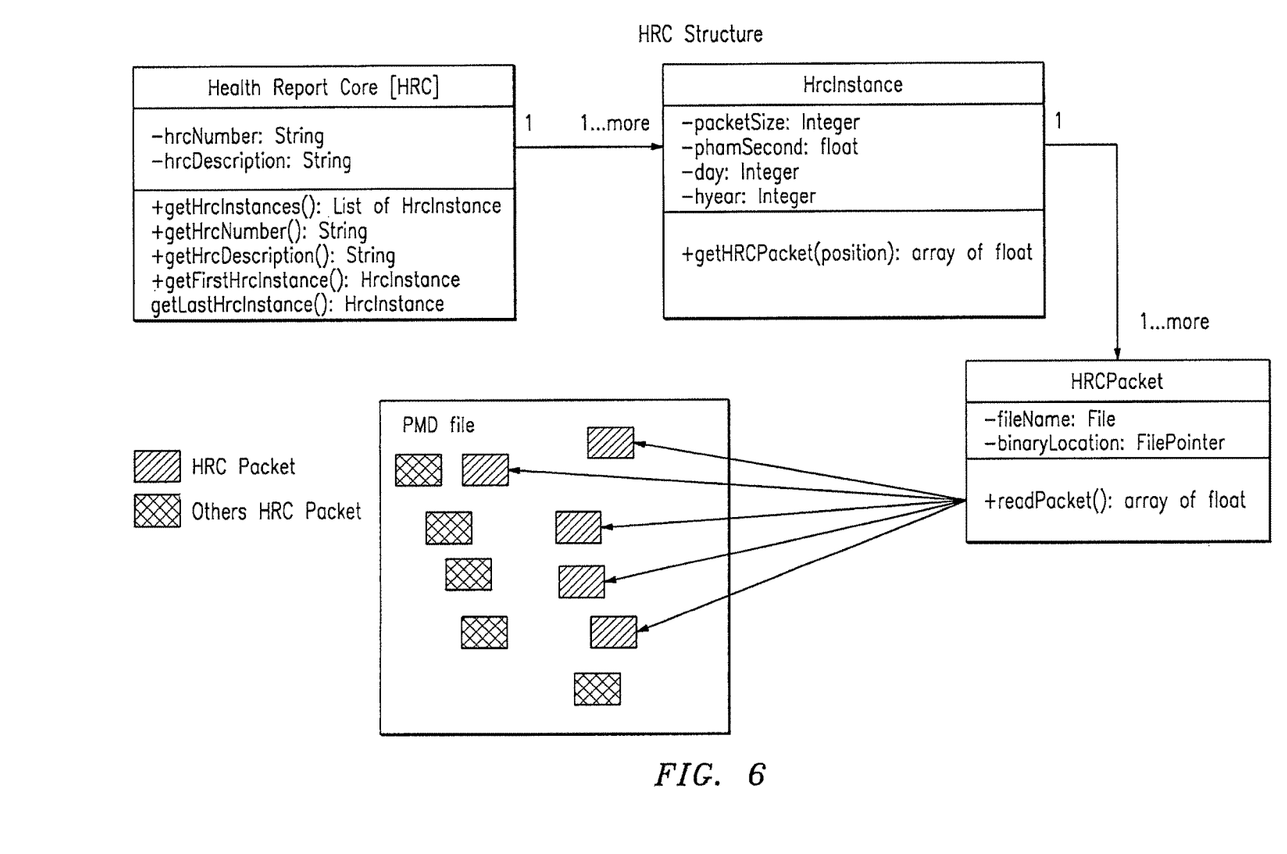
FIG. 6 is an example class diagram of a Health Report Code Structure.

With reference to FIG. 5, each record in the Hash Map represents HRC data accessible through its specific HRC number. The Hash Map is also time sorted per HRC instance. In other words, an HRC record can occur more than once and is known as an HRC instance (FIG. 6), which instances are grouped and time sorted.

A pass by reference approach is a preferred approach and can be implemented by giving the classes the responsibility of knowing how to read the information they need to report directly from the file. This is facilitated by the use of NIO since it allows OBPHM to randomly access bytes of information in the file at lightning fast speeds. Testing showed that NIO is capable of reading a 192 MB PMD file in about 20 milliseconds, a drastic improvement over the traditional Java IO which took about 2 minutes. This approach vastly reduces the memory signature of having access to the HRC data.

An OBPHM test of the method 100 to process Portable Memory Device (PMD) files reads 192 MB worth of HRC record data using NIO, filters the read HRC record data by type, then generates the equivalent of what would be a usage report on disk—a typical use case for the current OBPHM implementation. The results show a drastic improvement over previous implementations. In one example, the method 100 is able to handle roughly 166,000 instances and generates the report in under 2 minutes in contrast to conventional stable implementation that only process around 7500 instances in 30-40 minutes. This equates to processing nearly 2200% more instances in $\frac{1}{10}$ of the time. This is based on a conventional stable implementation that should be able to generate a usage report in about 20 minutes if it had nothing else to do which is pretty much in sync with previous testing that demonstrated that for a workload of 7500 instances, the database alone was taking up between 20-25 minutes of the processing time.

Beneficially, the memory usage for generating the Hash Map structure, that feeds the data needs of the usage report, roughly uses about 900 KB worth of heap memory. This amount of memory consumption is negligible, given a standard Java Heap Memory size of 64 MB. The method 100 gives OBPHM the ability to meet relatively rapid processing time requirements for the PMD files. Even the consumption for eight files running at once shows that the Java Heap Memory is of minimal consequence. The mapping structure required by all threads processing the files remains under 8 MB leaving potential for other processes and objects to reside in the Java Heap Memory.

An added benefit of this method 100 is that it provides a better idea of what the actual hardware constraints should be for a machine running the OBPHM process. Given that the maximum memory usage for a single PMD is 192 MB, a full load would yield a memory usage of 1536 MB. This number, added to the recommended memory setup for the operating system that the target machine runs, provides the memory required. At this point the memory requirements for such a machine stand at 3 GB to 4 GB.

A fast file reading library such as NIO and a proper low memory consuming mapping scheme efficiently process PMD files in order to meet the processing time requirements. Accessing any specific HRC is achieved quickly by providing service methods over the mapped structure of the PMD data. Using this mapping scheme is also a lot easier from a coding perspective than having to read (stream) the data to downstream processes.

It should be appreciated that the PMD data modeling system can be generalized to provide different mapping schemes to serve other purposes so long as: 1) the data is binary data. 2) the binary data is disorganized; and 3) the binary data follows a predefined structure which will be used to map it.

The use of the terms "a" and "an" and "the" and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to the normal operational attitude of the vehicle and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed:

1. A method comprising:
   receiving on an Off Board Prognostics Health Monitor (OBPHM) including a processor, from an electronic engine control, a Portable Memory Device (PMD) file that includes data from a plurality of sensors that communicate with the electronic engine control;
   extracting, by the processor, the data from the received PMD file;
   mapping, by the processor, each of a multiple of Health Report Code (HRC) records from the extracted data such that each HRC record is randomly accessible through a specific HRC number related to each of the multiple of HRC records;
   time sorting, by the processor, the multiple of HRC records; and
   accessing the time sorted HRC records using a pass by reference approach that allows information in the received PMD file to be randomly addressed.

2. The method as recited in claim 1, wherein at least one of the multiple of HRC records occurs more than once while mapping to form an instance.

3. The method as recited in claim 2, wherein each instance is grouped and time sorted.

4. The method as recited in claim 3, wherein the time sorted instances include a binary buffer pointer.

5. The method as recited in claim 2, wherein the mapping includes time sorting each HRC record per HRC instance.

6. The method as recited in claim 1, further comprising receiving the PMD file from a gas turbine engine.

7. A method comprising:
   receiving on an Off Board Prognostics Health Monitor (OBPHM) including a processor, from an electronic engine control, a Portable Memory Device (PMD) file that includes data from a plurality of sensors that communicate with the electronic engine control;
   extracting, by the processor, the data from the received PMD file; and
   generating, by the processor, a relationship between each of a multiple of Health Report Code (HRC) records, HRC instances, and packets within a Hash Map based on the extracted data,
   accessing the HRC records using a pass by reference approach that allows information in the received PMD file to be randomly addressed,
   wherein each HRC instance is grouped and time sorted with respect to the multiple of HRC instances.

8. The method as recited in claim 7, wherein each record in the Hash Map represents HRC data accessible through its specific HRC number.

9. The method as recited in claim 1, wherein the data is binary data.

10. The method as recited in claim 3, further comprising:
    processing, by the processor, the data using the time sorted instances to determine a usage of an engine module over time.

11. The method as recited in claim 1, further comprising:
    determining that a file location has the PMD file;
    based on determining that the file location has the PMD file, reading the PMD file; and
    based on reading the PMD file, saving a binary buffer pointer packet location in a hash tree map.

12. The method as recited in claim 11, wherein the saving of the binary buffer pointer packet is based on determining that an end of file is not reached.

* * * * *